(12) United States Patent
Majumder

(10) Patent No.: US 12,424,849 B2
(45) Date of Patent: Sep. 23, 2025

(54) METHOD OF CONTROLLING A POWER DISTRIBUTION SYSTEM INCLUDING A MICROGRID

(71) Applicants: Hitachi Energy Ltd, Zürich (CH); ABB Schweiz AG, Baden (CH)

(72) Inventor: Ritwik Majumder, Vasteras (SE)

(73) Assignees: HITACHI ENERGY LTD, Zurich (CH); ABB SCHWEIZ AG, Baden (CH)

( * ) Notice: Subject to any disclaimer, the term of this patent is extended or adjusted under 35 U.S.C. 154(b) by 659 days.

(21) Appl. No.: 17/430,687

(22) PCT Filed: Feb. 21, 2020

(86) PCT No.: PCT/EP2020/054592
§ 371 (c)(1),
(2) Date: Aug. 12, 2021

(87) PCT Pub. No.: WO2020/169788
PCT Pub. Date: Aug. 27, 2020

(65) Prior Publication Data
US 2022/0166218 A1 May 26, 2022

(30) Foreign Application Priority Data
Feb. 22, 2019 (EP) .................................. 19158755

(51) Int. Cl.
*H02J 3/06* (2006.01)
*H02J 3/38* (2006.01)
*H02J 13/00* (2006.01)

(52) U.S. Cl.
CPC ................ *H02J 3/06* (2013.01); *H02J 3/388* (2020.01); *H02J 13/00002* (2020.01)

(58) Field of Classification Search
CPC ...... H02J 3/388; H02J 3/46; H02J 3/06; H02J 3/42; G05B 19/042; G05B 2219/2639;
(Continued)

(56) References Cited

U.S. PATENT DOCUMENTS 10,044,192 B2* 8/2018 Singh ................. H02J 13/00002
2014/0249686 A1* 9/2014 Brainard ................... H02J 3/40
700/286
(Continued)

FOREIGN PATENT DOCUMENTS

JP 2002-152976 A 5/2002
JP 2013-93996 A 5/2013
(Continued)

OTHER PUBLICATIONS

International Search Report and Written Opinion for corresponding PCT Application No. PCT/EP2020/054592 dated Apr. 9, 2020, 15 pages.
(Continued)

*Primary Examiner* — Darrin D Dunn
(74) *Attorney, Agent, or Firm* — Procopio, Cory, Hargreaves & Savitch LLP

(57) ABSTRACT

Method (300) of controlling a distribution network (1) and a microgrid controller (8) adapted for the method. The distribution network (1) comprises assets (3-7) in a first part (1a) and a second part (1b). which parts (1a, 1b) are selectively connected to each other into an interconnected state at a connection point (PCC). The method comprises monitoring (301, 306) and controlling (310) the assets (3-7) of the distribution network (1). In a first control mode (310A), the first part (1a) is controlled by a distribution network controller (9) and the second part is controlled by the microgrid controller (8). Especially, the method includes selecting (303) between controlling (310) the distribution
(Continued)

network (1) in the interconnected state in accordance with the first control mode (310A), and controlling (310) the distribution network (1) in the interconnected state in accordance with a second control mode (310B), in which second control mode (310B) the assets (3-7) of the both the first part (1a) and the second part (1b) are controlled by the distribution network controller (9).

5 Claims, 4 Drawing Sheets

(58) Field of Classification Search
CPC . G05B 9/02; Y02P 80/14; Y04S 10/12; Y04S 10/16
See application file for complete search history.

(56) References Cited

U.S. PATENT DOCUMENTS

| | | | | |
|---|---|---|---|---|
| 2016/0313716 | A1* | 10/2016 | Chen | H02J 4/00 |
| 2016/0329711 | A1* | 11/2016 | Majumder | H02J 3/16 |
| 2017/0005473 | A1 | 1/2017 | Somani et al. | |
| 2017/0040800 | A1* | 2/2017 | Majumder | H02J 3/26 |
| 2017/0237256 | A1* | 8/2017 | Majumder | H02J 3/06 307/80 |
| 2018/0054055 | A1* | 2/2018 | Majumder | H02J 3/06 |
| 2019/0036340 | A1 | 1/2019 | Meeker et al. | |
| 2019/0326755 | A1* | 10/2019 | Fu | H02J 13/00002 |
| 2021/0159695 | A1* | 5/2021 | Sun | H02J 3/001 |

FOREIGN PATENT DOCUMENTS

| | | | |
|---|---|---|---|
| JP | 2018-207776 A | 12/2018 | |
| WO | 2013015773 A1 | 1/2013 | |
| WO | WO-2016029944 A1 * | 3/2016 | H02J 3/381 |
| WO | 2017/004125 A1 | 1/2017 | |
| WO | WO-2017067585 A1 * | 4/2017 | |
| WO | WO-2017211399 A1 * | 12/2017 | G05B 15/02 |
| WO | 2020/169788 A1 | 8/2020 | |

OTHER PUBLICATIONS

Caldognetto et al., Experimental Verification of an Active Microgrid with Distributed Power-Based Control, University of Padova, Italy, Sep. 2015, 8 pages.

"Research on smooth switching control method and strategy of microgrid", Journal of Changsha Social Work College, vol. 24, No. 4, Dec. 2017, 4 pages.

* cited by examiner

METHOD OF CONTROLLING A POWER DISTRIBUTION SYSTEM INCLUDING A MICROGRID

TECHNICAL FIELD

The present invention relates to electric power system, especially to control of distribution systems that includes a microgrid. An aspect of the present invention provides a microgrid controller.

BACKGROUND AND PRIOR ART

A typical electric power system comprises power generators at power plants that produce electric energy. The power system further includes a transmission system with transmission lines, at high voltage e.g. above 140 kV, for transferring the produced electric power to a distribution side of the power system were the electric power is consumed. The transmission system would usually include high voltage lines and the power is transformed down to the power distribution system that uses medium voltage; above 1 kV but below 100 kV, such as between 15 and 45 kV. The distribution system may therefore start with a transformer at a substation and include distribution lines in a grid, or network, for transferring the electric power at medium voltage and low voltage to loads for consumption.

A Distribution System Including a Microgrid

The distribution system may in addition to loads include other assets, such as distributed generators, energy storages and voltage source converters. The distribution system may therefore include power production facilities, however providing a net consumption of electric power. A distribution system network may also comprise a part that both produces and consumes power and which may run alone; a microgrid. Thus, a distribution network may include a first part connected to a transmission system and a second part that may provide a net production of electrical energy, e.g. a microgrid, which second part is arranged downstream from the first part in the direction from the transmission system and which second part may be disconnected from the first part and run alone by means of distributed generators arranged in the second part, i.e. in the microgrid, but which second part is (usually) not connected to the transmission grid. The second part, or microgrid, is connectable to, and disconnectable from, the first part by means of a breaker arranged at a so-called PCC (point of common coupling). Thus, the microgrid is connectable to the transmission grid via the first part of the distribution network.

Controlling the Distribution System and the Microgrid

For the control of the electric power in the distribution grid, the distribution grid may be provided with a network control system, or distribution network controller, such as a distribution network controller using a Distribution Management System (DMS). A DMS comprises software for analyzing measurements and controlling a network, and in general DMS provides functionality to monitor a distribution network and to control a distribution network. A DMS suitably includes a Volt-VAR control (VVC) that monitors and control voltage levels and reactive power in the distribution network, for example by means of controlling tap-changers and series capacitors. A DMS suitably also includes a Load Shedding application (LSA) in order to disconnect loads in the distribution system in cases of undesired electrical conditions in the distribution network. Also, a DMS may provide power flow control and fault management. DMS may provide an automated network control as well as providing network data for operators by means of GUI (Graphical User Interface).

The distribution network controller can utilize DMS to monitor the distribution network between the transformer connecting the distribution network to the transmission network and the PCC connecting the distribution network to the microgrid; i.e. monitor the first part of the distribution network. Based on the monitoring of the first part of the distribution network, the assets of the first part of the distribution network are controlled, such as energy storages, controllable loads, tap change transformers, distributed generators, and controlled series capacitors.

A microgrid is normally provided with a microgrid controller, being a central controller or a controller distributed among assets of the microgrid. The microgrid controller would normally monitor a second part of the distribution network, from the PCC and downstream, e.g. monitor the voltage level and the power flow at the PCC, and monitor electrical entities at several locations within the microgrid, or second part, such as the voltage and current in transfer lines, or cables, at generators, at loads and at transformers within the microgrid. The microgrid controller may provide voltage level control, reactive power control, load shedding, power flow control and active power balancing within the microgrid network when the microgrid is grid-connected as well as when the microgrid is disconnected from the rest of the distribution grid, i.e. when the microgrid is islanded.

Thus, a typical distribution network that includes a microgrid, may in general comprise a distribution network controller provided to monitor and control assets in a first part of the distribution network from the PCC and upstream, whereas a microgrid controller is provided to monitor a second part of the distribution network; the microgrid, from the PCC and downstream. The microgrid controller may be used to control the power flow at the PCC, i.e. between the microgrid and the first part of the distribution network.

A microgrid usually optimize its own operation and does not surge for the overall functioning of the distribution system. US2017/016071 (E1) aims at solving the problem that microgrids do not interoperate with distribution management systems (DMS), see § 0004 and § 0005 of E1. An idea in E1 is that the microgrid should contribute to the "overall power grid optimization" (§ 0025). E1 presents examples of what should be achieved by means of the microgrid; e.g. contribute to reactive power in the distribution grid (§ 0012, § 0036), volt/VAR control (§ 0023, § 0032) and "energy and cost optimization" (§ 0024). In order to reach these goals, the microgrid of E1 has been adapted to operate in a so called "VPP mode" (referring to Virtual Power Plant" in § 0030), where the microgrid is used to inject active and reactive power, and to support voltage and frequency (§ 0036 of E1).

A disadvantage with the virtual power plant suggested in E1 is that the control scheme of E1 tends to be complicated and if the microgrid is subjected to sudden topological or electrical variations, operations may become unstable which may cause a blackout or disconnection of the microgrid. Moreover, viewing a microgrid as a Virtual Power Plant is a simplification, since a microgrid usually is more complex than a power plant. A microgrid may also include several distributed generators including e.g. distributed generators with varying power output, for example from a renewable source like a solar PV plant or wind power plant and viewing the microgrid as a VPP may lead to a use of the microgrid in much less optimized way than a conventional control by means of a dedicated microgrid controller may provide. The VPP operation aims to support the distribution grid by achieving a setpoint for the microgrid at the PCC, and such operation can contribute to provide optimization functions for the distribution network upstream the PCC, but may negatively affect the microgrid.

SUMMARY OF INVENTION

An aim of the present invention is to provide an alternative to the control of a microgrid without the drawbacks of the prior art. For this purpose, aspects of the present invention provide means to extend control of a distribution network into a microgrid that is connected to the distribution network.

According to a first aspect, the present invention provides a method of controlling assets in a distribution network, which distribution network comprises a first part and a second part, which first and second part comprise assets, such as generators and loads. The first part and the second part of the distribution network are selectively connected to each other into an interconnected state. The distribution network further comprises a network controller and a microgrid controller. The method comprises monitoring the distribution network, including electrical entities in the distribution network and controlling the assets of the distribution network based on the monitoring. The controlling further includes controlling the assets of the distribution network in the interconnected state in accordance with a first control mode, wherein the assets of the first part are controlled by the distribution network controller and the assets of the second part are controlled by the microgrid controller.

Especially, the method of the first aspect comprises selecting between controlling the assets of the distribution network in the interconnected state in accordance with the first mode, and controlling the assets of the distribution network in the interconnected state in accordance with a second control mode, in which second mode the assets of the first part and the assets of the second part are controlled by the distribution network controller.

Using a second mode, wherein the second part is controlled by the distribution network controller, it contributes to a better performance in the control of the distribution network. The control, in the first mode, of the second part by means of the microgrid controller, provides a fallback for controlling the second part in the grid-connected state. Unsuitable control of the second part, or microgrid, may more easily be avoided than in prior art systems.

In an embodiment of the first aspect, the selection is performed by the microgrid controller.

Letting the microgrid controller effectuate the mode switches, contributes to a facilitated implementation in different distribution network control systems, since main functionality may be provided by the microgrid controller when adding a microgrid to the distribution network.

In an embodiment of the first aspect, the selection includes evaluating at least one electrical entity of the second part of the distribution network and switching from the second mode to the first mode when any electrical entity violates a threshold bandwidth for that electrical entity.

In a further embodiment, the evaluated at least one electrical entity of the second part comprises at least one of the following:
the voltage level at the connection (PCC) between the distribution network and the microgrid,
the reactive power flow between the first part of the distribution network and the second part of the distribution network,
the active power flow between the first part of the distribution network and the second part of the distribution network,
the voltage level at an asset within the second part of the distribution network, and
the current from an asset of the second part of the distribution network.

An embodiment of the first aspect includes
selecting a specific control function, such as a so called DMS function (Distribution Management System), for the distribution network controller, and
controlling the assets in the first part in the first mode in accordance with the control function, or
controlling the assets in the distribution network, i.e. the first and second part, in the second mode in accordance with the control function.

In this embodiment the first mode, and/or the second mode, may further include informing the microgrid controller which specific control function is currently used by the distribution network controller. In this way, the microgrid controller may be adapted to contribute to performing the selected DMS function when in control of the second part, so that the second part, or microgrid, may support the first part of the distribution network. For example, when being informed that the distribution network controller in the second mode provides a DMS function such as voltage control, the second part may after switching to the first mode contribute to the DMS function by supporting the voltage level at the PCC, still controlling the microgrid based on measurements in the microgrid.

In an embodiment of the first aspect, a breaker is arranged at the PCC and the monitoring of the second part of the distribution network includes monitoring the status of the breaker, and the method further includes switching to a third control mode when the breaker opens, in which third control mode the second part is controlled as an islanded microgrid by the microgrid controller.

According to a second aspect, the present invention provides a microgrid controller for controlling a part, especially a microgrid, of a distribution network. A distribution network that comprises a first part and a second part each of which comprises assets, and wherein the first part and said second part is selectively connected to each other into an interconnected state at a connection point (PCC). The distribution network further comprises a network controller. The microgrid controller comprises:
a monitoring functionality, or monitoring means, configured to monitor the second part of the distribution network,
a controller configured to control assets in the second part of the distribution network based on the monitoring of the second part, and which controlling is performed in accordance with a first control mode in said interconnected state. Especially, the microgrid controller comprises:
a mode selector configured to select between controlling the assets of the second part of the distribution network in the interconnected state in accordance with the first mode, and controlling the assets of the second part of the distribution network in the interconnected state in accordance with a second control mode, in which second control mode the assets of the second part are controlled by the distribution network controller, and
a mediator of monitored data configured to mediate monitored data in the second control mode to the distribution network controller.

Thus, the microgrid controller is configured to select control mode based on the monitoring of the second part by means of the monitor function and to mediate data retrieved during the monitoring of the second part to the distribution network controller in the second control mode.

In an embodiment of the second aspect, the microgrid controller further comprises an evaluator configured to evaluate at least one electrical entity of the second part of the distribution network in view of respective threshold bandwidth for each evaluated electrical entity, wherein the mode selector is adapted to switch from the second control mode to the first control mode when an electrical entity violates the threshold bandwidth for that electrical entity.

In an embodiment of the second aspect, the evaluated at least one electrical entity of the second part comprises at least one of the following:
- the voltage level at the connection (PCC) between the first part of the distribution network and the second part of the distribution network,
- the reactive power flow between the first part of the distribution network and the second part of the distribution network,
- the active power flow between the first part of the distribution network and the second part of the distribution network,
- the voltage level at an asset in the second part of the distribution network, or
- the current from an asset in the second part of the distribution network.

In an embodiment of the second aspect, the mode selector is adapted to switch back from the first control mode to the second control mode when an evaluated electrical entity has re-entered the threshold bandwidth for that electrical entity, and, preferably stayed within the bandwidth for a predefined time.

Thus, the microgrid controller is configured to switch back when the monitored and evaluated electrical entity no longer violates the threshold, and preferably has remained within the bandwidth and stabilized a preset time period.

In an embodiment of the second aspect, the monitoring means is adapted to monitor the status of a breaker arranged at the PCC for the interconnection of the first part and the second part of the distribution network. In this embodiment, the mode selector is adapted to switch to a third control mode when the breaker opens, and the microgrid controller is configured to control the second part in accordance with the third control mode as an islanded microgrid.

In an embodiment of the second aspect, the microgrid controller further comprises a mediator of control signals configured to mediate control settings from the distribution network controller to the assets of the second part of the distribution network, especially to distributed generators, voltage source converters and/or energy storages of the second part.

DESCRIPTION OF EMBODIMENTS

Figure 1:
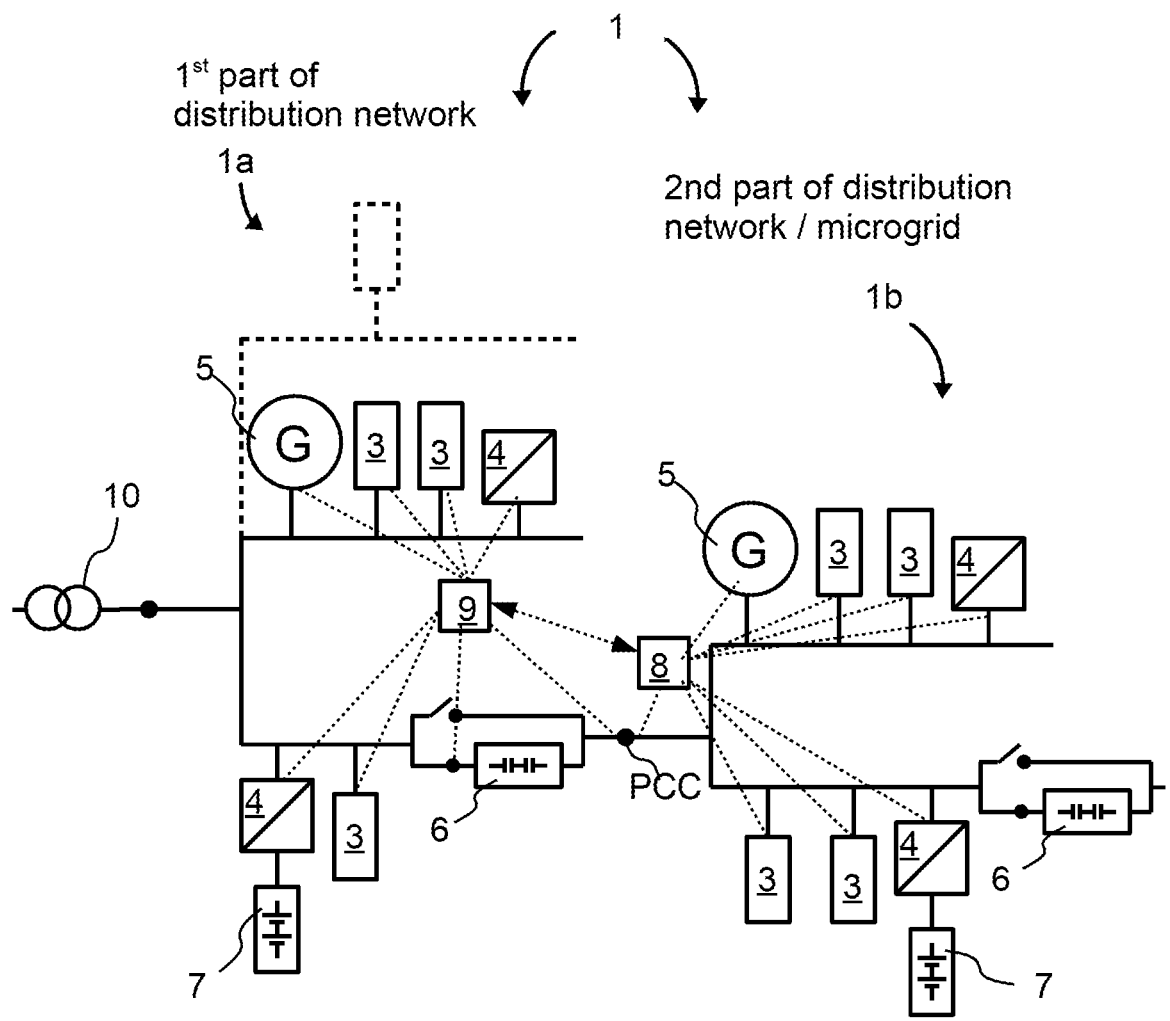
FIG. 1 illustrates a distribution network that includes a microgrid.

FIG. 1 illustrates a distribution network 1 that constitutes two parts, a first part 1a connected via a transformer 10 to a power transmission grid, and a second part 1b, which second part is a microgrid, connected to the first part 1a at a PCC (Point of Common Coupling). The distribution network 1 comprises a number of assets 3-7, exemplified as loads 3, voltage source converters 4, distributed generators 5, a series capacitor 6 and energy storages 7. The energy storages 7 and distributed generators 5 may be connected to the distribution network grid 1 a voltage source converter 4. The assets 3-7 are arranged in the first part 1a as well in the microgrid 1b. The first part 1a comprises a distribution network controller 9, which is operatively connected to the assets 3-7 of the first part 1a and arranged to monitor the first part 1a of the distribution grid 1, including the PCC. The microgrid 1b includes a microgrid controller 8 arranged to monitor the microgrid 1b including the PCC and is operatively connected to the assets 3-7 of the microgrid in order to control these assets 3-7, for example connecting and disconnecting an asset, or adjust settings for the control of a distributed generator 5. The distribution network controller 9 and the microgrid controller 8 are communicatively connected to each other.

Controlling the first part 1a of the distribution network by means of a distribution network controller 9 that monitors the first part 1a of the distribution network from the PCC and upstream is similar to conventional prior art systems. Controlling the second part 1b of the distribution network by means of a microgrid controller that monitors the second part 1b, or microgrid, of the distribution network from the PCC and downstream is similar to conventional prior art systems. Thus, embodiments of the present invention may provide control of a microgrid, the second part 1b, in a grid-connected state, where the second part 1b is connected to the first part 1a, in similar fashion as prior control systems.

However, according to the embodiments of the present invention, the distribution network controller 9 is configured to monitor and control the assets 3-7 also of the second part 1b (i.e. the microgrid) of the distribution network 1 in addition to monitoring and controlling the assets 3-7 of the first part 1a. This monitoring and control of the assets 3-7 in the second part 1b may in embodiments of the invention be performed by the distribution network controller 9 via the microgrid controller 8. Thus, embodiments of the invention provide an additional mode of control of the assets of the microgrid, i.e. the second part 1b, in the grid-connected state. Also, embodiments provide a method of switching between these to control modes, so that the two control modes of the grid-connected state may selectively be used.

Figure 2A:
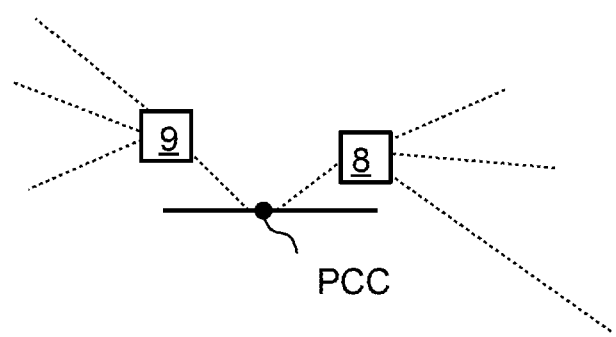
FIGS. 2A-C illustrate three control modes.
Figure 2B:
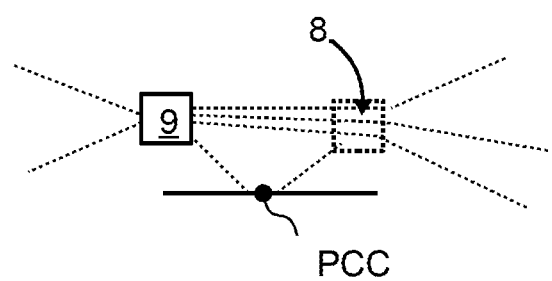
Figure 2C:
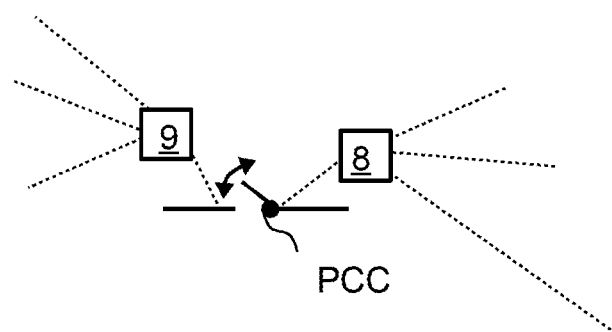

FIGS. 2A-C illustrates the first, second and third mode of operation of the microgrid controller. In the first and second mode of operation, the first part 1a is connected to the second part 1b (i.e. the microgrid) at a connection point; the PCC, and the first mode and the second mode constitute selectable modes of operation of the microgrid controller 8 in this grid-connected state.

In the first mode of operation, the microgrid controller 8 monitors the microgrid including the PCC and controls the assets 3-7 of the microgrid, as indicated with the dotted monitoring and control lines of FIG. 2A. The distribution network controller 9 monitors and controls the first part 1a of the distribution grid 1, including monitoring the PCC. The microgrid controller 8 is provided to control the distribution network 1 downstream the PCC, i.e. the second part 1b, and the distribution network controller 9 is provided for controlling the distribution network upstream the PCC, i.e. the first part 1a. Both the power flow and voltage are monitored at the PCC, by both the distribution network controller 9 and the microgrid controller 8. Also, the status of the connection at the PCC, such as the status of an interconnecting breaker (not illustrated) is monitored by both controllers 8 and 9.

In the third mode of operation illustrated in FIG. 2C, the first 1a and second 1b parts of the distribution network 1 are disconnected from each other at the PCC and the microgrid controller 8 is provided to control the distribution network downstream the PCC, i.e. the microgrid that is also referred to as the second part 1b, and the distribution network controller 9 is provided to control the distribution network upstream the PCC, i.e. the first part 1a. In this case there is no power flow at the PCC and only the voltage is monitored on both sides of the PCC.

FIG. 2B illustrates the second mode of operation wherein the microgrid controller 8 is provided to mediate monitoring and control signals between the microgrid 1b, including the assets 3-7 of the microgrid 8, and the distribution network controller 9. The distribution network controller 9 is provided to monitor both the first part 1a and the microgrid 1b (second part) and also control the assets 3-7 of both the first 1a and the second part 1b of the distribution network 1. In this second operating mode, the microgrid controller 8 is provided to monitor and evaluate electrical entities in the microgrid 1b and switch control mode if any electrical entity violates a corresponding threshold for that entity. Thus, the microgrid controller 8 is configured to provide a monitoring function and regain control of the second part 1b if an electrical entity violates a threshold, for example for safety or stability purposes, or avoiding power losses.

Figure 3:
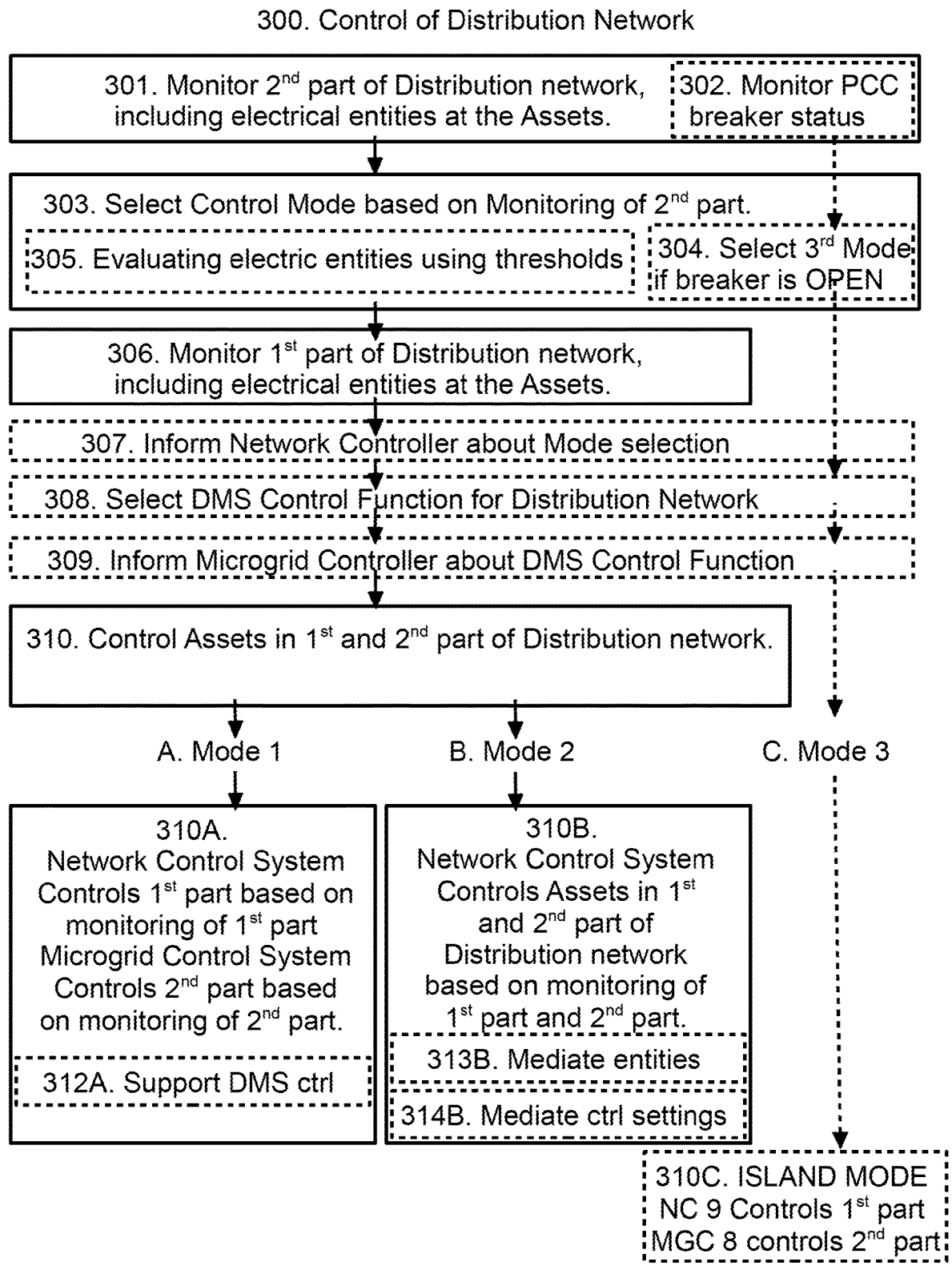
FIG. 3 illustrates an embodiment of a method of controlling a microgrid and a distribution network.

FIG. 3 presents a method 300 of controlling a distribution network 1, especially the assets 3-7 of the distribution network 1, in an embodiment of the present invention. The method 300 includes monitoring 306 the first part 1a of the distribution network 1, monitoring 301 the second part 1b of the distribution network and controlling 310 the first part 1a and the second part 1b of the distribution network 1. In more detail, the distribution network controller 9 monitors and controls 310A the first part 1a, and the microgrid controller 8 monitors and controls the second part 1b, which controlling 310 is performed in a "first" control mode. These monitoring 301, 306 and controlling 310, 310A are similar to the conventional control of a distribution network 1 that includes, or is connected to, a microgrid (the second part 1b). Thus, in the first control mode (310A), the control of the distribution network 1 is performed by both controllers 8 and 9, each controller 8 or 9 controlling a respective part 1a or 1b of the distribution network 1.

The control method 300 also includes selecting 303 a control mode. In short, the selection 303 of control mode is based on the monitoring 301 of the second part 1b and, in the grid-connected state, either the first control mode 310A or a second control mode 310B is selected. In the second control mode 310B, the controlling 310 of both the first part 1a and the second part 1b of the distribution network 1 is performed by the distribution network controller 9 on the basis of the monitoring 306 of the first part 1a and the monitoring 301 of the second part 1b. Thus, the distribution network controller 9 monitors the whole distribution network 1 and controls the assets 3-7 in the whole distribution network 1, i.e. the assets 3-7 downstream, as well as upstream, of the PCC.

A microgrid, such as the second part 1b of the distribution network 1, may also be disconnected and controlled in an island mode. The control method 300 also includes such an island mode, or third control mode 310C. Islanding may be planned, or may be an un-planned event. To prepare for an un-planned event, the monitoring 301 of the second part 1b includes monitoring 302 the connection at the PCC, especially the status of a breaker arranged at the PCC for selectively connecting and dis-connecting the first part 1a and the second part 1b. If the breaker is open, the method includes selecting the third control mode, i.e. the island mode, 310C wherein the distribution network controller controls the first part 1a and the microgrid controller 8 controls the second part 1b. Planned islanding may include receiving, by means of the microgrid controller 8, an islanding message from a control system, such as the distribution network controller 9.

The embodiment of the control method 300 of FIG. 3 also illustrates some optional, but preferred, control measures illustrated within broken lines. Preferably, the selection 302 of control mode includes evaluating 305 electrical entities, as monitored 301 in the second part 1b. The evaluating 305 may include comparing the electrical entities using a criterion including threshold bandwidths, and upon detecting a violation selecting the first control mode 310A. Each evaluated electric entity have its own respective bandwidth, such as a range, a minimum level or maximum level, and the microgrid controller 8 is configured to select the first control mode 310A when a violation of allowed bandwidth is detected.

Some examples on monitored and evaluated electric entities are given in the following.

The criteria for mode switching in the grid-connected state may include:
monitoring the power balance within the microgrid (second part 1b) and switching to the first mode 310A of operation of the microgrid when the power balance of the microgrid (1b) violates a first threshold, which first threshold is a power balancing threshold. The first mode 310A of operation may preferably include power balancing of the microgrid (1b).

The criteria for mode switching in the grid-connected state may include:
monitoring the voltage level within the microgrid (1b) and switching to the first mode 310A of operation when a second threshold is reached, which second threshold is a voltage level threshold. The first mode 310A of operation preferably includes voltage control in the microgrid 1b.

The criteria for mode switching in the grid-connected state may include:
monitoring the reactive power and switching to the first mode 310A of operation when a third threshold is reached, which third threshold is a reactive power threshold. The first mode 310A of operation preferably includes reactive power control in the microgrid 1b.

The criteria for mode switching in the grid-connected state may include:
monitoring the voltage level and reactive power within the microgrid 1b and switching to the first mode 310A when the second and/or the third thresholds is/are reached. The first mode 310A may preferably include VVC (Volt-VAR Control) of the microgrid 1b, and/or the first part 1a. The first mode 310A may include Volt-VAR optimization in the microgrid (1b), or the first part 1a, including VCC and for example simultaneously keeping system losses, or voltage drops, to a minimum.

The criteria for mode switching in the grid-connected state may include:
monitoring the harmonics in the microgrid 1b and switching to the first mode 310A of operation when a fourth threshold is reached, which fourth threshold is a threshold of harmonics. The first mode 310a of operation may preferably include counteracting harmonics in the microgrid.

The microgrid controller 8 may be further configured to switch back to the first mode of operation when said criteria, e.g. first, second third and fourth, has re-entered, and preferably stabilized, into the acceptable bandwidth again, or has stopped violating the threshold in question.

Further suitable control measures of the embodiment of FIG. 3 includes informing 307 the distribution network controller 9 about the selected control mode. The selection 303 of control mode is performed by the microgrid controller 8 that suitably inform 307 the distribution network controller 9 about the selection.

The distribution network controller 9 is suitably selected or configured to employ control functionality in the distribution network 1, preferably so called DMS functionality. The distribution network controller 9 preferably selects 308 a specific control function to be employed. Also, the distribution network controller 9 is preferably configured to inform 309 the microgrid controller 8 about the selected control function, e.g. the selected DMS function. The distribution network controller 9 will subsequently employ the selected DMS function when controlling 310A the first part 1a in accordance with the first mode. The distribution network controller 9 will employ the selected DMS function when controlling 310B the first and the second parts 1a, 1b in accordance with the second mode. In the first mode, the microgrid controller may support 312A the selected DMS function in view of the received (at 309) indication of DMS function. The distribution network controller 9 may inform 309 the microgrid controller 8 about the selected DMS function in both the first and second mode, and also in the third mode, so that the microgrid controller 8 becomes prepared for supporting 312A the DMS function in the first mode 310A.

The distribution network controller 9 may be configured with direct communication for monitoring and controlling of the second part 1b. However, a preferred embodiment wherein the microgrid controller 8 mediates 313B the monitoring, such as the measurements of electrical entities in the second part 1b is illustrated in FIG. 3. Also, a preferred embodiment wherein the microgrid controller 8 mediates 314B control signals, such as control settings for the assets 3-7 of the second part 1b is illustrated in FIG. 3. Thus, the microgrid controller 8 is configured to mediate 313B measured electrical entities and mediate 314B control settings between the second part 1b and the distribution network controller 9 when performing the second control mode 310B.

In a further embodiment (not illustrated in FIG. 3), the microgrid controller 8 is configured to monitor at least one location in the first part 1a of the distribution network 1, such as an asset 3-7, electrical line or breaker in the distribution network. The distribution network controller 9 may be configured to mediate such monitoring, including a measured electrical entity or entities in the distribution network 1. When supporting 312A the DMS function performed by the distribution network controller 9 in the first part 1a, such monitoring can be suitable for the microgrid controller 8 and the supporting 312A of DMS functionality may for example be based in part on monitoring an electrical entity at a location in the first part 1a that is remote from the second part 1b. Thus, the distribution network controller 9 and the microgrid controller 8 may be adapted to mediate measurements of electrical entities to each other, wherein the distribution network controller 9 transfer data of electrical entities of the first part 1a to the microgrid controller 8 and the microgrid controller 8 transfer data of electrical entities in the second part 1b to the distribution network controller 9. Such exchange may in addition to measurements include status information of monitored devices in the respective part 1a, 1b of the distribution network 1.

Figure 4:
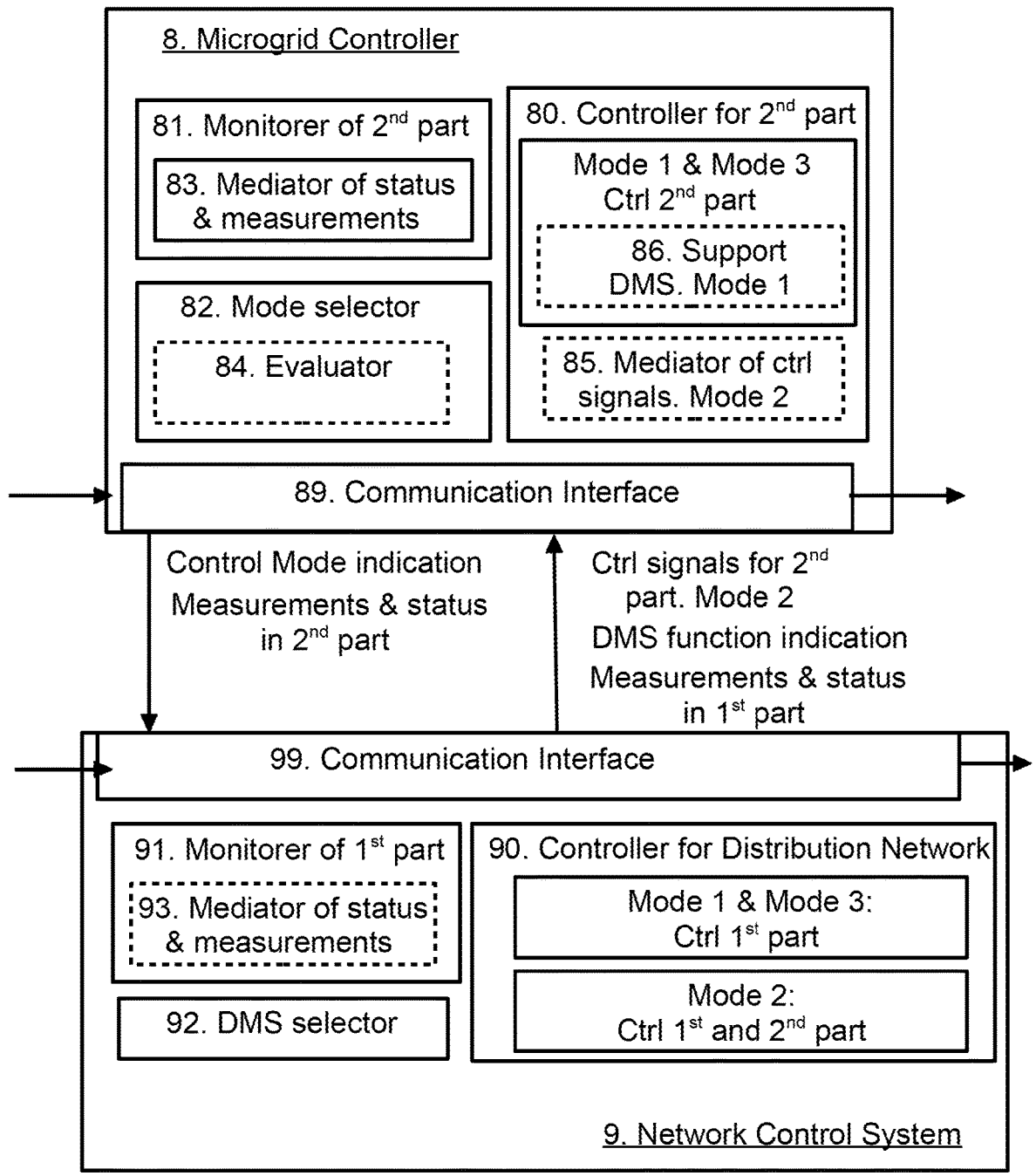
FIG. 4 illustrates an embodiment of a microgrid controller, and a network controller.

FIG. 4 illustrate an embodiment of a microgrid controller 8 and a distribution network controller 9 for performing the control method of the invention. FIG. 4 is a simplified illustration of the construction of the controllers 8, 9 and primarily disclose control functions for carrying out said control method, and discloses preferred embodiments for the interaction of the microgrid controller 8 and the distribution network controller 9 when cooperating in carrying out the control method 300 in FIG. 3. The microgrid controller 8 and the distribution network controller 9 comprises a combination of hardware and software selected and configured for carrying out different functions for the control of a distribution network. These different functions are illustrated as blocks in FIG. 4. The microgrid controller 8 and the distribution network controller 9 comprises respective communication interfaces 89, 99 for their mutual communication. Communication interfaces utilized for monitoring and control of the parts 1a, 1b of a distribution network 1 are not explicitly illustrated in FIG. 4. However, such communication may be provided by the same communications interfaces 89, 99, as indicated by horizontal arrows, symbolizing input and output, in FIG. 4, and performed by means of a control system network, e.g. a SCADA system, or is similar.

As main function blocks, the microgrid controller 8 comprises:
  a controller 80 configured to control the second part 1b, especially a microgrid, of a distribution network 1,
  a monitoring function, or monitor, 81 configured to monitor the second part 1b of the distribution network,
  a mode selector 82 for selecting control mode for the distribution network, and a communication interface 89 configured for exchanging information with the distribution network controller 9.

The controller 80 for the second part is configured to control the second part 1b of the distribution network 1 in the first and third control mode, i.e. in accordance with the first control mode 310A and the third control mode 310C of FIG. 3. The controller 80 preferably includes a support function 86 configured to supporting 312A the DMS function in the first mode 310A, which DMS function is employed by distribution network controller 9. As indicated in FIG. 4, the communication interface 89 is preferably used to receive a "DMS function indication" from the distribution network controller 9, via communication interface 99 of the distribution network controller 9. The controller 80 for the second part 1b, of the microgrid controller 8, preferably includes a mediator 85 of control signals configured to mediate 314B control signals, such as settings for the assets 3-7 of the second part 1b during the second control mode 310B. The mediator 85 is configured to transfer control signals received from the distribution network controller 9 to the second part 1b of the distribution network 1 during the second control mode 310B. The controller 80 is configured to receive the control signals, such as including settings for assets 3-7, such as distributed generators 5, of the second part 1b, from the distribution network controller 9 by means of the communication interfaces 89 and 99, as illustrated in FIG. 4. The microgrid controller 8 may also receive measurements and status information of the first part 1a of the distribution network from the distribution network controller 9 via the communication interface 89. The DMS support function 86 may preferably be adapted to provide supporting 312A of the DMS function on the basis of the measurements and status information received from the distribution network controller 9, in the first control mode 310A.

The monitor function 81 comprises a mediator 83 of monitoring data, especially status and measurement information, from the monitoring 301 of the second part 1b of the distribution network 1, which mediator 83 is configured to mediate 313B the monitoring data, especially electrical entities, of the second part 1b to the distribution network controller 9 during the second control mode 310B.

The monitor function 81 is preferably also configured to monitor 302 the connection at the PCC, especially the status of the interconnecting breaker at the PCC. In an unplanned islanding of the second part 1b, the microgrid controller 8 is preferably configured to select 304 the third control mode 310C, for example on the basis of the status of the interconnecting breaker.

The mode selector 82 is configured to perform the selection 303 of control mode on the basis of the monitoring 301 of the second part 1b of the distribution network 1. The mode selector 82 preferably includes an evaluator 84 configured to evaluate 305 one or more electrical entities monitored in the second part 1b, which evaluating 305 is made in view of thresholds of ranges, minimum and/or maximum levels, as disclosed herein with reference to the embodiments of FIG. 3. The microgrid controller 8 is preferably configured to informing 307 the distribution network controller 9 about the mode selection via the communication interfaces 89, 99, as indicated in FIG. 4.

The mode selector 82 is preferably also configured to select 304 the third control mode 310C, i.e. the island mode, based on monitoring 302 of the PCC status, as illustrated in FIG. 3 (not illustrated in FIG. 4). The mode selector 82 may thus be adapted to select 304 the third control mode 310C when the status of a breaker at the PCC change to "open".

The distribution network controller 9 comprises main function blocks:
- a controller 90 configured to control 310 assets 3-7 in the distribution network 1, especially
  - assets 3-7 in the first part 1a in the first, and third, control mode 310A/C, and
  - assets 3-7 in both the first and second parts 1a, 1b in the second control mode 310B,
- a monitor function 91 configured to monitor the first part 1a of the distribution network 1,
- a DMS selector configured to select 308 control function for the control 310 of the distribution network, especially select 308 a control function
  - to control 310 the first part 1a in the first mode 310A, and
  - to control 310 the first and second parts 1a, 1b in the second mode 310B, and
- a communication interface 99 configured for communicating with the microgrid controller 8, and preferably also for monitoring 306 the first part 1a of the distribution network 1 and control 310 the assets 3-7 of the first part 1a of the distribution network.

As further illustrated in FIG. 4, the distribution network controller 9 is preferably configured to receive a control mode indication (see 307 in FIG. 3), and measurements and status indications concerning the second part 1b of the distribution network 1 from the microgrid controller 8. Also as illustrated, the distribution network controller 9 is configured to transfer a DMS function indication (see 309 in FIG. 3), measurement and status information of the first part 1a, and control signals (see 314B in FIG. 3), in the second control mode 310B, to the microgrid controller 8.

The present invention has been described with reference to embodiments of the aspects of the invention; a method 300 of controlling a distribution network 1 and a microgrid controller 8 adapted for the method. The distribution network 1 comprises assets 3-7 in a first part 1a and a second part 1b, which parts 1a, 1b are selectively connected to each other into an interconnected state at a connection point (PCC). The method comprises monitoring 301, 306 and controlling 310 the assets 3-7 of the distribution network 1. In a first control mode 310A, the first part 1a is controlled by a distribution network controller 9 and the second part is controlled by the microgrid controller 8. Especially, the method includes selecting 303 between controlling 310 the distribution network 1 in the interconnected state in accordance with the first control mode 310A, and controlling 310 the distribution network 1 in the interconnected state in accordance with a second control mode 310B, in which second control mode 310B the assets 3-7 of the both the first part 1a and the second part 1b are controlled by the distribution network controller 9.

The present invention provides a microgrid control system 8, or microgrid controller, that is configured to extend DMS monitoring and control functions, into the microgrid (second part 1b). The microgrid controller 8 is configured to control the microgrid (second part 1b) in an islanded state as well as in a grid-connected state, having two modes of operation in the grid-connected state: a first mode 310A of operation controlling the microgrid autonomously, and a second mode 310B of operation including extending DMS functionality to within the microgrid. The microgrid controller 8 is configured to extend DMS monitoring and control in a grid-connected state as long as at least one criterion for microgrid 8 functionality is fulfilled, and to disrupt DMS monitoring and control and act autonomously when at least one of said at least one criterion is violated. The microgrid controller 8 is configured to switch between the first 310A and second mode 310B of operation in dependency on the fulfilment or violation of at least one criterion.

Said criteria for abandoning the DMS extension and control the microgrid autonomously preferably also includes detecting if the breaker at the PCC is open. Thus, the microgrid controller 8 is configured to monitor the status of the breaker at the PCC and a "fifth" criterion for mode switching is when the status of the PCC breaker opens. When the breaker is open, the microgrid controller 8 switch to island mode; which island mode can be regarded as a third control mode 310C. The third control mode 310C may include an islanding phase that leads from the grid-connected state to an islanded state.

The invention comprises the first control mode 310A and third control mode 310C, wherein the microgrid controller 8 controls the assets of the microgrid, in similar fashion as microgrid controllers of the prior art. Thus, the microgrid controller 8 can monitor and control the microgrid (1b) when grid-connected (first mode 310A) as well as when islanded (third mode 310C). During the first 310A and third mode 310C of operation, the distribution network controller 9 monitors and controls the distribution network upstream from the microgrid (i.e. the first part 1a). Both the microgrid controller 8 and the distribution network controller 9 preferably monitor the voltage level and power flow at the PCC.

A difference with the invention compared to prior art is that the microgrid controller 8 and the distribution network controller 9 can function in the second control mode 310B. The second control mode 310B of the microgrid controller 8 includes acting as an extension of the distribution controller 9 to monitor the microgrid 1b and forwarding monitoring data, regarding electrical entities in the microgrid (i.e. second part 1b), to the distribution network controller 9. The second control mode 310B of the distribution network controller 9 includes controlling the distribution network 1 including both the first part 1a and the second part 1b, especially the assets 3-7 of both parts 1a, 1b, which controlling is based on monitoring both parts 1a, 1b. In embodiments of the present invention, the change from the second control mode 310B to the third control mode 310C of operation of the microgrid controller 8 is performed when the breaker opens. In the embodiments of the present invention, the change (in 303 of FIG. 3) from the second mode 310B of operation to the first mode 310C of operation is performed when at least one predefined criterion for an electric entity deviates (in 305 of FIG. 3) from an acceptable operation bandwidth or violates a maximum or minimum threshold.

The present invention is, however, not limited to the presented embodiments. The scope of the invention being defined with the attached claims, within which scope the invention may be provided in various forms by the skilled person.

The invention claimed is:

1. A method of controlling a distribution network comprising a first part and a second part, each of said parts comprising assets, said first part and said second part being selectively connected to each other into an interconnected state at a point of common coupling (PCC), said distribution network further comprising a distribution network controller, configured to control the assets in both the first part and the second part of the distribution network, and a microgrid controller, configured to control the assets in the second part of the distribution network, the method comprises:

monitoring the distribution network, including at least one electrical entity of the distribution network;

selecting a specific control function for the distribution network controller;

controlling the assets of the distribution network based on the monitoring, wherein the controlling includes when the at least one electrical entity violates a range, controlling the assets of the distribution network in the interconnected state in accordance with a first control mode, in which the assets of the first part are controlled by the distribution network controller in accordance with the specific control function and the assets of the second part are controlled by the microgrid controller, and in response to the at least one electrical entity no longer violating the range while in the first control mode, controlling the assets of the distribution network in the interconnected state in accordance with a second control mode, in which the assets of the first part and the second part are both controlled by the distribution network controller in accordance with the specific control function;

wherein one or both of the first control mode or the second control mode further includes informing the microgrid controller which specific control function is currently being used by the distribution network controller.

2. The method according to claim 1, wherein switching between the first control mode and the second control mode is determined by the microgrid controller.

3. The method according to claim 1, wherein the controlling further includes switching from the second control mode to the first control mode in response to the at least one electrical entity violating the range.

4. The method according to claim 3, wherein the at least one electrical entity comprises at least one of the following: voltage level at the PCC between the first part of the distribution network and the second part of the distribution network, reactive power flow between the first part of the distribution network and the second part of the distribution network, active power flow between the first part of the distribution network and the second part of the distribution network, voltage level at an asset in the second part of the distribution network, or current from an asset in the second part of the distribution network.

5. The method according to claim 1, wherein a breaker is arranged at the PCC and the monitoring of the second part of the distribution network includes monitoring the status of the breaker, and the method further includes switching to a third control mode when the breaker opens, in which third control mode the second part is controlled as an islanded microgrid by the microgrid controller.

* * * * *